Patented Dec. 11, 1923.

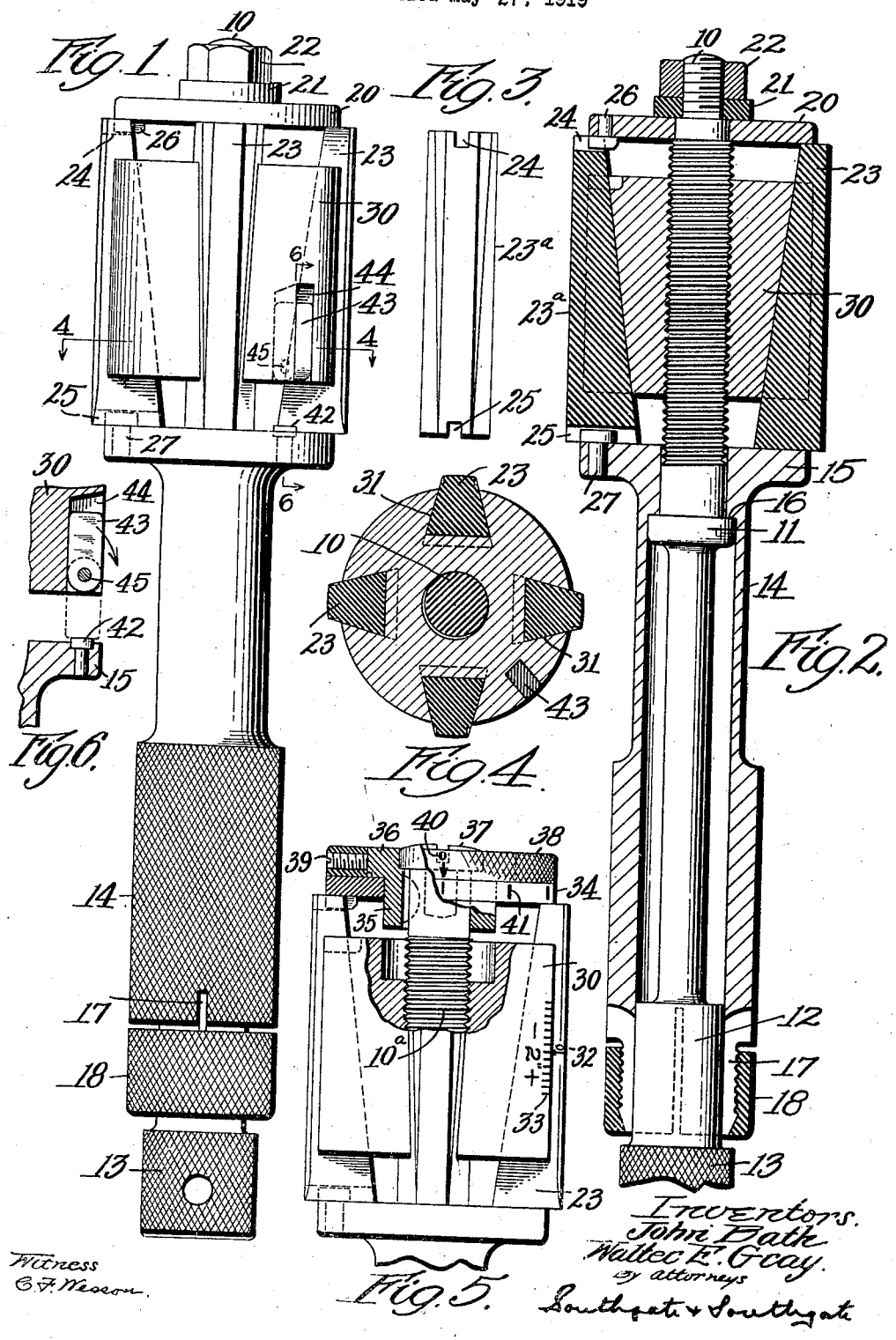

1,476,681

UNITED STATES PATENT OFFICE.

JOHN BATH, OF WORCESTER, AND WALTER E. GRAY, OF HYDE PARK, MASSACHUSETTS, ASSIGNORS TO JOHN BATH & CO., INC., A CORPORATION OF MASSACHUSETTS.

ADJUSTABLE GAUGE.

Application filed May 27, 1919. Serial No. 300,053.

*To all whom it may concern:*

Be it known that we, JOHN BATH and WALTER E. GRAY, citizens of the United States, said BATH residing at Worcester, in the county of Worcester and State of Massachusetts, said GRAY residing at Hyde Park, in the county of Norfolk and State of Massachusetts, have invented a new and useful Adjustable Gauge, of which the following is a specification.

This invention relates to an adjustable gauge particularly designed for measuring and comparing inside diameters.

The usual solid plug gauge is not always satisfactory for such purposes, as it merely indicates that a hole is above or below standard size without indicating even the approximate amount of variation. Such a gauge is also of very little use in determining variations in diameter in a long hole, and particularly in a hole having only one open or accessible end. Furthermore, no indication is given by a solid gauge as to whether or not a hole is exactly circular.

It is the general object of our invention to provide an improved adjustable gauge by which holes and recesses may be accurately measured and compared, and by which information may be secured which is not obtainable by the use of the old style solid plug gauge. By the use of our improved gauge, different parts of a hole may be accurately measured and compared, variations in diameter may be determined with great accuracy, and in one form of our invention, direct scale readings of sizes may be obtained with unusual precision.

With this general object in view, one feature of our invention relates to the provision of a gauge in which a plurality of separate contact members are provided, preferably arranged in pairs and equally spaced around the gauge. In the preferred form of our invention these members are mounted in a support by which they are limited to radial movement only. Another feature of our invention relates to the provision of means for moving said members radially, simultaneously and of means for holding the members firmly in adjusted position.

Other features relate to the provision of means for reading either the actual size or the comparative variation from a standard, and to provision for setting the gauge to a standard size.

Our invention further relates to arrangements and combinations of parts which will be hereinafter described and more particularly pointed out in the appended claims.

A preferred form of our invention, together with a modification, is shown in the drawings, in which—

Fig. 1 is a front elevation of our improved gauge;

Fig. 2 is a longitudinal sectional view thereof;

Fig. 3 is a front elevation of one of the contact members;

Fig. 4 is a transverse sectional view, taken along the line 4—4 in Fig. 1;

Fig. 5 is a detail elevation, partly in section, and showing a modification, and Fig. 6 is a sectional detail view, taken along the line 6—6 in Fig. 1.

Referring to the drawings, our improved gauge comprises a threaded shaft 10 having a shoulder 11 thereon, and also having a bearing portion 12 and a knurled handle 13. The shaft 10 is rotatable in a sleeve 14 having a flange 15 at one end and having also an inner shoulder 16 engaging the shoulder 11 on the shaft 10. The lower end of the threaded portion of the shaft 10 has a bearing in one end of the casing 14 and the portion 12 of the shaft has a bearing in the opposite end of the casing 14 which is provided with a series of slots 17. A clamping nut 18 may be caused to engage the beveled outer end of the casing to force the slotted portion of the casing against the portion 12 of the shaft 10 thereby preventing relative angular movement of the parts and thus preserving any desired adjustment of the gauge.

A disc 20 is loosely mounted on the reduced upper end of the shaft 10 and is held from axial movement thereon by a collar 21 and nut 22. A plurality of wedge-shaped contact members 23 is positioned between the flange 15 and the disc 20, and one of said members 23ª is provided with end slots 24 and 25 extending radially and receiving headed studs 26 and 27 fixed in the disc 20 and flange 15 respectively. The contact member 23ª is thus limited to radial movement, and the disc 20 is held from angular movement relative to the flange 15 on the casing 14.

A collar 30 is threaded to fit the shaft 10 and is provided with a plurality of dove-tailed inclined slots 31 adapted to receive the contact members 23, the parts being so proportioned that the outer faces of the contact members are parallel with the axis of the gauge.

The gauge is adjusted to any desired diameter within its range by turning the handle 13 of the threaded shaft 10, thus moving the collar 30 axially and moving the contact members 23 radially in or out according to the direction of movement of the collar 30. When the contact members have been moved to the desired position they may be held in such position by tightening the clamping nut 18, thus clamping the shaft 10 within the casing 14.

As the contact members are arranged in oppositely disposed pairs, a variation from a true circle may be readily determined by turning the gauge around after the members have been expanded or moved outwards to engage the inside of the hole. If the size of the hole varies on different diameters, such variation will be readily indicated by the increased or decreased resistance of the plug to angular movement in different positions.

Our invention as thus far described does not directly indicate scale readings but merely comparative sizes when used in connection with a standard ring-gauge or other test piece.

In order to provide a direct or comparative scale reading, we have designed the form of our invention shown in Fig. 5, in which two different scales are provided. For approximate reading of the diameter, an index mark or zero point 32 is provided on one of the contact members 23, and scale divisions 33 are provided upon the adjacent portion of the collar 30. An intermediate point on this scale may be designated with a standard size, as 2", and the graduations on each side indicate the variations above or below standard size. Each graduation may indicate one one-hundredth of an inch variation in diameter, or such other scale reading as may be desired, the value of each graduation depending upon the exact wedge angles employed in constructing the gauge and upon the pitch of the screw thread on the shaft 10.

For closer reading, the disc 34 (corresponding to the disc 20 in Fig. 2) is mounted upon the hub 35 of a bushing 36 fitting the end of the threaded shaft 10ª and held thereon by a screw 37. A ring 38 may be adjustably secured to the outer portion of the bushing 36 and may be held thereon in adjusted position by a set-screw 39. The ring 38 is provided with a zero mark or index 40 and the disc 34 is provided with a plurality of graduations which may conveniently indicate one one-thousandth of an inch increase in gauge diameter. Finer graduations may also be provided if desired. This arrangement is particularly useful for indicating variation from a standard or test piece. The contact members are first set to the exact diameter of the standard and while in this position the ring 38 is adjusted on the bushing 36 until the zero mark corresponds to the zero graduation on the disc 34.

Variations from this standard size can then be read directly in hundredths of an inch on the scale 33 and in thousandths of an inch by the graduations 41 on the disc 34.

We have also made provision for setting the gauge to a standard size by means of cooperating stops. For this purpose we have shown a stop or anvil 42 (Figs. 1 and 6) seated in a recess in the flange 15 and preferably formed of hardened steel. We have also shown a cooperating stop member or arm 43 disposed in a slot 44 in the collar 30 and pivoted therein at 45. This arm may be swung downward to the dotted line position of Fig. 6, where it will engage the anvil or stud 42 to definitely space the collar 30 from the flange 15.

When not in use, the arm 43 may be turned up into the slot 44, and the collar 30 may then be freely moved in either direction. The arm and anvil will be carefully finished as to length, so that when in engagement, the contact members will register the exact size desired. It will be noted that the gauge is expanding as the stop members engage, thus eliminating back lash.

Having thus described our invention it will be evident that we have provided an extremely simple and reliable form of adjustable gauge capable of extremely accurate operation and adjustable for a considerable range of sizes, covering perhaps one-eighth or three-sixteenths of an inch variation of diameter for each gauge.

It will also be evident that changes and modifications can be made therein by those skilled in the art without departing from the spirit and scope of our invention as set forth in the claims, and we do not wish to be otherwise limited to the details herein disclosed, but what we claim is:—

1. An adjustable gauge having, in combination, a support, a threaded shaft mounted for rotation only in said support, a plurality of contact members, each having an inner face formed as a single surface inclined with respect to the axis of the shaft, and a single collar threaded on said shaft and provided with axially extending grooves inclined with respect to said shaft and in which said members are closely slidable, said single collar forming the only radial support of said members.

2. An adjustable gauge having, in combination, a support, a threaded shaft mounted for rotation only in said support, a single collar threaded on said shaft and having a plurality of axially extending dove-tailed grooves inclined with respect to the axis of said shaft, a plurality of contact members slidably fitting said grooves and radially supported by said collar, and positioning devices engaging the ends of said members and effective to prevent longitudinal or angular movement of said members relative to said support.

3. An adjustable gauge having, in combination, a support, a plurality of contact members, each member being wedge-shaped and of dove-tailed cross section and having an inner face inclined with respect to the axis of the gauge, a shaft mounted for rotation only in said support, and a single collar mounted on said shaft and forming the entire radial support for said members, said collar being movable axially by said shaft to adjust said members radially.

4. An adjustable gauge having, in combination, a support, a plurality of gauge bars mounted in said support for radial movement only relative to said support, said gauge bars each having an inner face inclined with respect to the axis of the gauge and each being of dove-tailed cross section with straight side walls, an actuating member having a dove-tailed groove therein for each gauge bar inclined with respect to the axis of the gauge, the side walls of said grooves engaging the sides of said gauge bars on the greater part of the surface of said sides and said actuating member constituting the entire radial and circumferential support for said gauge bars between the ends thereof, and means to move said actuating member axially relative to said support.

5. An adjustable gauge having, in combination, a support, a plurality of contact members mounted therein, each increasing in width toward the axis of the guage and having an inner face inclined with respect to the axis of the gauge, a ring collar forming the entire radial support for said members and having longitudinal grooves in which said members are slidably mounted, means to move said collar axially of said support, and means to prevent axial or rotary movement of said members relative to said support.

6. An adjustable gauge having, in combination, a plurality of contact members, a support in which said members are mounted having guide elements fixed therein, and an actuating part having operative engagement with said members and movable axially in said support to adjust said members radially in said support, said members being mounted for radial movement only relative to said support, and one of said members having radial guide-ways fitting the guide elements in said support.

7. An adjustable gauge having, in combination, a threaded shaft having bearing portions, a flanged casing mounted on said shaft and rotatably fitting said bearing portions, a disc mounted on said shaft and concentric therewith, means to prevent axial and angular movement of said disc relative to said casing, said means including a plurality of gauge bars mounted between said flanged casing and said disc and each having a continuous bearing surface inclined with respect to the axis of said shaft, and a collar threaded on said shaft and having inclined bearing surfaces engaging the inclined bearing surfaces of said gauge bars, said collar forming a unitary, radial and circumferential support for said members and being effective to adjust said members simultaneously radially of said casing when said collar is moved longitudinally by rotation of said threaded shaft.

8. An adjustable gauge having, in combination, a plurality of contact members, an adjusting shaft, connections between said shaft and said members, a casing having bearings for said shaft, one of said bearings being split, and means to contract said split bearing to lock said shaft in adjusted position in said casing.

9. An adjustable gauge having, in combination, a plurality of contact members, a support in which said members are mounted for radial movement only relative to said support, and an actuating part having operative engagement with said members and movable axially in said support to adjust said members radially thereof, the outer surface of said actuating part being fully exposed alongside and adjacent the contact surfaces of said members, and the exposed outer surface of said actuating part and an adjacent exposed surface of one of said contact members being provided with indications thereon co-operating to show changes in gauge size by changes in the axial relation of said actuated part and said contact member.

10. An adjustable internal gauge having, in combination, a body having a longitudinal axis, a rotatable shaft supported in bearings at both ends of said body and held against relative axial movement therein, an actuating member having undercut guideways with the inner faces thereof inclined with respect to the axis of the gauge, a plurality of gauge bars fitting said guideways and each having an inclined inner face engaging one of said inclined faces in said actuating member for the greater part of the length thereof, said actuating member forming the entire radial support for said gauge bars and having threaded engagement with said rotatable shaft for axial movement thereby to adjust said bars simultaneously radially, and means to prevent longitudinal movement of said gauge bars with said actuating member relative to said body.

11. An adjustable gauge comprising a support, a plurality of contact members, means including a threaded shaft rotatable in said support and effective to move all of said members simultaneously radially relative to said support, means including a disc non-rotatable relative to said support and effective to prevent axial movement of said members, and a second disc angularly adjustable relative to said shaft, and means to secure said second disc to said shaft in any desired angular relation thereto, said two discs having cooperating graduations indicating radial movement of said contact members.

12. An adjustable gauge having, in combination, a plurality of contact members, a support in which said members are mounted for radial movement only relative to said support, an actuating part having operative engagement with said members and movable axially in said support to adjust said members radially thereof, and a positive stop for said part movable into and out of position to stop said part in a predetermined intermediate position.

13. An adjustable internal gauge having, in combination, a body having a longitudinal axis, a rotatable shaft supported in bearings at both ends of said body and held against relative axial movement therein, an actuating member having undercut guideways with the inner faces thereof inclined with respect to the axis of the gauge, a plurality of gauge bars fitting said guideways and each having an inclined inner face engaging one of said inclined faces in said actuating member for the greater part of the length thereof, said actuating member forming the entire radial support for said gauge bars and having threaded engagement with said rotatable shaft for axial movement thereby to adjust said bars simultaneously radially, means to prevent longitudinal movement of said gauge bars with said actuating member relative to said body, and co-operating means for said body and for certain of said gauge bars effective to prevent circumferential movement of said bars relative to said body.

14. An adjustable gauge having, in combination, a plurality of contact members, a support in which said members are mounted for radial movement only relative to said support, an actuating part having operative engagement with said members and movable axially in said support to adjust said members radially thereof, and cooperating stops on said actuating part and said support, one of said stops being movable into and out of position to engage the other stop and thereby positively limit axial movement of said actuating part relative to said support.

15. An adjustable gauge having, in combination, a plurality of contact members, a support in which said members are mounted for radial movement only relative to said support, an actuating part having operative engagement with said members and movable axially in said support to adjust said members radially thereof, a stop fixed in said support, and a stop-engaging device movably mounted on said part.

16. An adjustable gauge having, in combination, a plurality of contact members, a support in which said members are mounted for radial movement only relative to said support, a collar having operative engagement with said members and movable axially in said support to adjust said members radially thereof, a stop fixed to said support, and an arm pivoted to said collar and movable into position to engage said stop.

17. An adjustable internal gauge having, in combination, a body member, a rotatable member supported in bearings in said body member and held from relative axial movement therein, an actuating member having threaded engagement with said rotatable member and having undercut guideways with bearing faces inclined with respect to the axis of the gauge, and a plurality of gauge bars, each having an inner bearing face also inclined with respect to the axis of the gauge, said gauge bars being supported entirely by said actuating member, and being slidably seated for the greater portion of their length in the undercut guideways thereof.

18. An adjustable internal gauge having, in combination, a body member, an end member held in spaced relation thereto, a rotatable member supported in bearings in both ends of said body member and held from relative axial movement therein, an actuating member having threaded engagement with said rotatable member and having undercut guideways with bearing faces inclined with respect to the axis of the gauge, and a plurality of gauge bars, each having an inner bearing face also inclined with respect to the axis of the gauge, said gauge bars being supported entirely by said actuating member and being each slidably seated for the greater portion of its length in one of the undercut guideways thereof, the ends of said gauge bars engaging said body and end members and being held from longitudinal movement thereby.

In testimony whereof we have hereunto affixed our signatures.

JOHN BATH.
WALTER E. GRAY.